United States Patent
Maor et al.

(10) Patent No.: US 11,108,818 B2
(45) Date of Patent: Aug. 31, 2021

(54) CREDENTIAL SPRAY ATTACK DETECTION

(71) Applicant: Microsoft Technology Licensing, LLC, Redmond, WA (US)

(72) Inventors: Tal Joseph Maor, Tel Aviv (IL); Gal Zeev Bruchim, Tel Aviv (IL); Igal Gofman, Bat-Yam (IL); Itai Grady Ashkenazy, Ramat Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 16/278,127

(22) Filed: Feb. 17, 2019

(65) Prior Publication Data

US 2020/0267178 A1    Aug. 20, 2020

(51) Int. Cl.
*H04L 29/06* (2006.01)

(52) U.S. Cl.
CPC ...... *H04L 63/1466* (2013.01); *H04L 63/1416* (2013.01); *H04L 63/308* (2013.01)

(58) Field of Classification Search
CPC ............. H04L 63/1466; H04L 63/1416; H04L 63/308; H04L 63/083; H04L 63/1425
USPC ........................................................ 726/23
See application file for complete search history.

(56) References Cited

U.S. PATENT DOCUMENTS

| | | | | |
|---|---|---|---|---|
| 7,444,263 | B2 * | 10/2008 | White | G06F 11/3409 |
| | | | | 700/51 |
| 7,523,499 | B2 * | 4/2009 | Wilkins | H04L 63/083 |
| | | | | 713/183 |
| 8,424,061 | B2 * | 4/2013 | Rosenoer | G06F 16/258 |
| | | | | 726/4 |
| 9,237,143 | B1 * | 1/2016 | Dotan | H04L 63/08 |

(Continued)

FOREIGN PATENT DOCUMENTS

| | | |
|---|---|---|
| CN | 108011863 A | 5/2018 |
| CN | 110581827 A | 12/2019 |

OTHER PUBLICATIONS

"What's new in Azure ATP", retrieved from <<https://docs.microsoft.com/en-us/azure-advanced-threat-protection/atp-whats-new>>, Jan. 19, 2019, 19 pages.

(Continued)

*Primary Examiner* — Badri Narayanan
(74) *Attorney, Agent, or Firm* — Ogilvie Law Firm

(57) ABSTRACT

Cybersecurity is enhanced to detect credential spray attacks. Accounts with access failure events are divided into buckets B1 ... BN based on access failure count ranges R1 ... RN. For instance, accounts with one logon failure may go in B1, accounts with two failures in B2, etc. Buckets will thus have account involvement extents E1 ... EN, which are compared to thresholds T1 ... TN. An intrusion detection tool generates an alert when some Ei hits its Ti. Detection may spot any credential sprays, not merely password sprays. False positives may be reduced by excluding items from (Continued)

consideration, such as logon attempts using old passwords. False positives and false negatives may be balanced by tuning threshold parameters. Breached accounts may be found. Detection may also permit other responses, such as attack disruption, harm mitigation, and attacker identification. Credential spray attack detection may be combined with other security mechanisms for defense in depth of cloud and other network accounts.

20 Claims, 5 Drawing Sheets

(56) References Cited

U.S. PATENT DOCUMENTS

| | | | | |
|---|---|---|---|---|
| 9,438,604 | B1* | 9/2016 | Addala | H04L 63/10 |
| 9,942,248 | B1* | 4/2018 | Umland | H04L 63/1408 |
| 2006/0021034 | A1* | 1/2006 | Cook | H04L 63/083 |
| | | | | 726/22 |
| 2014/0181968 | A1* | 6/2014 | Ge | H04L 63/1425 |
| | | | | 726/23 |
| 2015/0350193 | A1* | 12/2015 | Honda | H04L 63/1416 |
| | | | | 726/8 |
| 2016/0036838 | A1* | 2/2016 | Jain | H04L 63/1416 |
| | | | | 726/23 |
| 2016/0197947 | A1* | 7/2016 | Im | H04L 63/1425 |
| | | | | 726/23 |
| 2016/0197948 | A1* | 7/2016 | Im | H04L 63/1425 |
| | | | | 726/23 |
| 2017/0063882 | A1* | 3/2017 | Be'ery | H04L 63/1425 |
| 2017/0195346 | A1* | 7/2017 | Be'ery | H04L 63/083 |
| 2017/0201531 | A1* | 7/2017 | Kim | H04L 63/1466 |
| 2017/0201542 | A1* | 7/2017 | Kim | H04L 63/1425 |
| 2017/0208076 | A1 | 7/2017 | Be'ery et al. | |
| 2017/0244749 | A1* | 8/2017 | Shulman | H04L 63/1425 |
| 2018/0007087 | A1* | 1/2018 | Grady | H04L 63/101 |
| 2018/0084069 | A1 | 3/2018 | Be'ery et al. | |
| 2018/0107820 | A1 | 4/2018 | Simakov et al. | |
| 2018/0205748 | A1* | 7/2018 | Gurkok | H04L 63/083 |
| 2018/0218134 | A1 | 8/2018 | Be'ery et al. | |
| 2018/0248900 | A1* | 8/2018 | Keshet | H04L 63/1425 |
| 2018/0359136 | A1 | 12/2018 | Krigsman et al. | |
| 2019/0007371 | A1 | 1/2019 | Burton et al. | |
| 2020/0112585 | A1* | 4/2020 | Keohane | H04L 9/3226 |

OTHER PUBLICATIONS

"Alert (TA18-086A): Brute Force Attacks Conducted by Cyber Actors", retrieved from <<https://www.us-cert.gov/ncas/alerts/TA18-086A>>, Mar. 27, 2018, 3 pages.

"Azure AD and ADFS best practices: Defending against password spray attacks", retrieved from <<https://www.microsoft.com/en-us/microsoft-365/blog/2018/03/05/azure-ad-and-adfs-best-practices-defending-against-password-spray-attacks/>>, Mar. 5, 2018, 14 pages.

"4776(S, F): The computer attempted to validate the credentials for an account.", retrieved from <<https://docs.microsoft.com/en-us/windows/security/threat-protection/auditing/event-4776>>, Apr. 18, 2017, 7 pages.

"4625(F): An account failed to log on.", retrieved from <<https://docs.microsoft.com/en-us/windows/security/threat-protection/auditing/event-4625>>, Apr. 18, 2017, 14 pages.

"Intrusion detection system", retrieved from <<https://en.wikipedia.org/wiki/Intrusion_detection_system>>, Jan. 26, 2019, 13 pages.

"Eliminate Bad Passwords in your Organization", Retrieved From: https://web.archive.org/web/20191031052154/https://docs.microsoft.com/en-us/azure/active-directory/authentication/concept-password-ban-bad, Jul. 11, 2018, 8 Pages.

"The 773 Million Record 'Collection #I' Data Breach", Retrieved From: https://www.troyhunt.com/the-773-million-record-collection-1-data-reach/, Jan. 17, 2019, 13 Pages.

Ero, et al., "Password Spraying Detection: Where do I Start?", Retrieved From: https://www.okta.com/blog/2019/03/password-spraying-detection-where-to-start/, Mar. 25, 2019, 9 Pages.

"International Search Report & Written Opinion issued in PCT Application No. PCT/US21/015969", dated Apr. 15, 2021, 12 Pages.

* cited by examiner

SOME EXAMPLES OF ALERTING INGREDIENTS 700

AR 702: AVERAGE NUMBER 704 OF USER ACCOUNTS WHOSE NUMBER 706 OF ACCESS FAILURE EVENTS IS IN RANGE R

STDV 708: STANDARD DEVIATION OF AR 702

MINDIFF 710: MINIMUM DISTANCE BETWEEN ALERT THRESHOLD T 214 AND AR 702

Fig. 7

SOME EXAMPLES OF ATTACK RESPONSES 800

DISRUPTION 802 OF THE ATTACK

IDENTIFICATION 804 OF A SOURCE 806 OF THE ATTACK

MITIGATION 808 OF A HARM 810 FROM THE ATTACK

IDENTIFICATION 812 OF ACCOUNT BREACHED BY ATTACK

Fig. 8

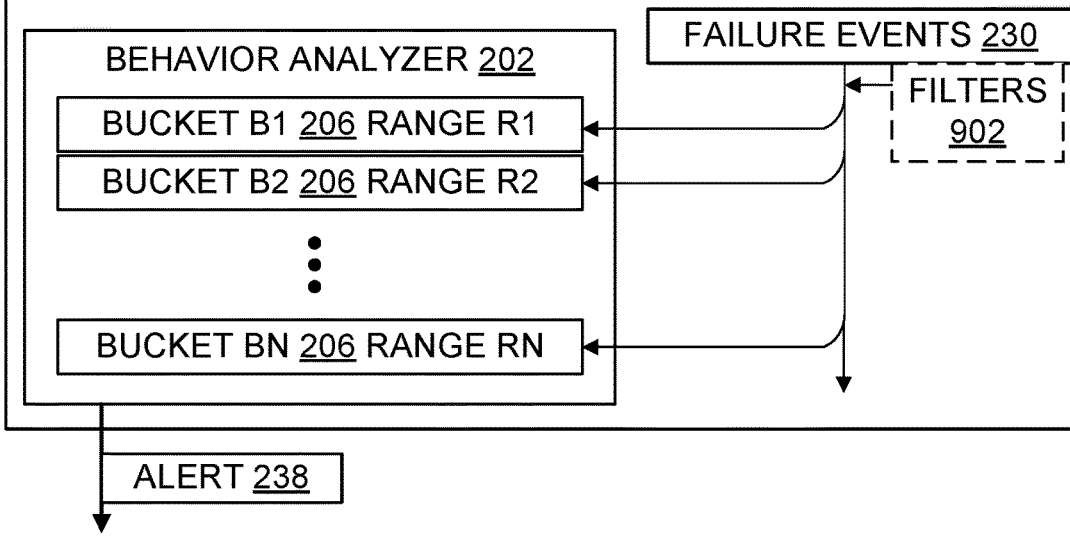

Fig. 9

CREDENTIAL SPRAY ATTACK DETECTION

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques for detecting password spray attacks is one of the many possibilities to consider when implementing defense in depth. A password spray attack is also sometimes called a "brute force" attack or a "low and slow" attack, but "password spray" is more precise, because there are other examples of brute force attacks and other examples of low and slow attacks. In a password spray attack, an attacker tests a given password against multiple accounts. Often the password is a weak but nonetheless widely used password such as "123456", "qwerty", or even "Password". If none of the accounts accept the first password tried, then a second password may be sprayed, i.e., tested against multiple accounts. The attack continues thus, until it is detected and shut down, or until the attacker succeeds in gaining illicit access to one or more accounts as desired.

SUMMARY

Some teachings herein were motivated by an initial technical challenge of detecting password spray attacks against cloud accounts. One emergent technical challenge was how to reduce false positives, that is, how to distinguish actual password spray attacks from non-malicious behaviors that resemble password spray attacks. In this context the inventors created automated access attempt behavior analysis tools and techniques which are suitable for detecting various spray attacks in production environments. Other technical challenges addressed by the innovations taught here will also be apparent to one of skill from the discussion provided below.

An intrusion detection system (IDS) for a guarded computing system (GCS) is taught in some embodiments herein. The IDS may reside partially or entirely in the GCS, or be located outside the GCS. The GCS has a plurality of user accounts which have respective user account identifiers. The IDS of some embodiments includes a processor, and a memory in operational communication with the processor. An access failure event set resides at least piecewise in the memory, meaning at least part of the data of the event set is in the memory when the IDS is analyzing access attempt behavior. The access failure event set includes access failure events which represent failed attempts to use credentials to access user accounts of the GCS. A bucket B of the IDS is configured to hold user account identifiers. Bucket B has a failure count range R, which has at least one endpoint value. An attack window may specify a time period, thereby delimiting failure events of interest; other event filters may also be applied to focus the access failure analysis, e.g., on a particular customer's accounts, a particular network segment, a particular address range, or particular applications or services.

In this example IDS, a behavior analyzer utilizes execution of the processor to analyze GCS access attempt behavior based on at least some of the access failure events. The behavior analyzer inserts in B the identifiers of user accounts whose number of access failure events within the attack window time period is in the range R. Then the behavior analyzer computes an extent E based on the number of user account identifiers in B, and generates a spray attack alert when the computed extent E meets or exceeds an alert threshold T. A "spray attack" is an attack that sprays passwords or other credentials against user accounts. The alert threshold T represents an amount of user accounts. The IDS enhances cybersecurity of the GCS by generating the spray attack alert in response to detection of an apparent credential spray attack against the GCS, such as in response to detection of activity which is consistent with a password spray attack or another credential spray attack against the GCS.

Some embodiments taught herein provide or use particular intrusion detection actions. Some perform intrusion detection for detecting credential spray attacks against a guarded computing system (GCS). The GCS has a plurality of user accounts which have respective user account identifiers. These intrusion detection actions include locating a plurality of N digital buckets B1 . . . BN, with N being at least 2, and associating respective failure count ranges R1 . . . RN with the buckets B1 . . . BN. Each Ri has at least one endpoint value. These intrusion detection actions also include getting respective alert thresholds T1 . . . TN which each represent an amount of user accounts.

In this example, intrusion detection actions also include reading access failure event data from an access failure event set. The access failure event set includes access failure events which represent failed attempts to use credentials to access user accounts of the GCS. By way of behavior analysis, these intrusion detection actions insert in each bucket Bi of the buckets B1 . . . BN the identifiers, if any, of user accounts whose number of access failure events is in the corresponding range Ri of the ranges R1 . . . RN, and compute an extent Ei based on the number of user account identifiers in each respective non-empty bucket Bi. This behavior analysis generates a spray attack alert when the computed extent Ei meets or exceeds the corresponding alert threshold Ti, for at least one Ti in T1 . . . TN. In some network event situations and some embodiments, intrusion detection actions will enhance cybersecurity of the GCS by generating the spray attack alert in response to an actual credential spray attack against the GCS, but false positives and false negatives may also occur. Some embodiments perform item exclusions or threshold tuning, or both, to reduce false results.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a block diagram illustrating some examples of ingredients that may be used in determining whether to generate a spray attack alert;

FIG. 8 is a block diagram illustrating some examples of responses to a spray attack;

FIG. 9 is a block diagram which enhances the teachings of FIG. 2 by illustrating aspects of some IDS architectures that have multiple buckets;

DETAILED DESCRIPTION

Overview

Figure 1:
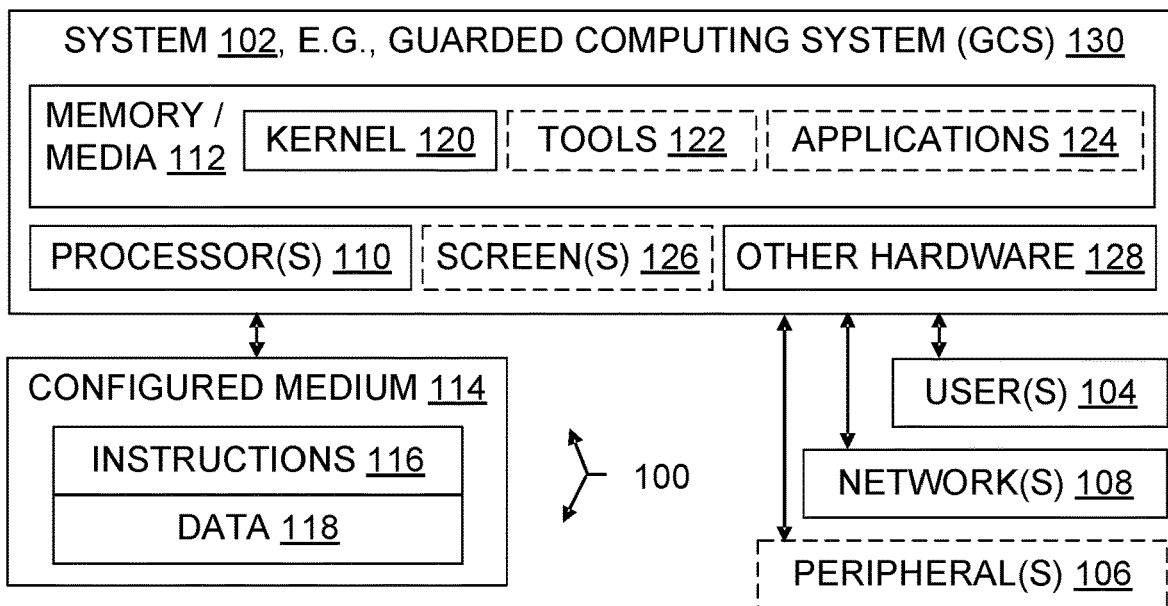
FIG. 1 is a block diagram illustrating computer systems generally and also illustrating configured storage media generally.

Many innovations expand beyond their origins, but understanding an innovation's origins can help one more fully appreciate the innovation. In the present case, some teachings presented herein were motivated by a technical challenge of increasing the security of Microsoft Azure® cloud accounts against password spray attacks (mark of Microsoft Corporation). An associated challenge was how to increase account security even though some account users will continue to use weak passwords despite warnings, training, and examples of harmful breaches facilitated by weak passwords. Other technical challenges addressed by the innovations taught here will also be apparent to one of skill from the discussion provided herein.

A password spray attack (sometimes referred to as a "horizontal brute force" attack) is a cyberattack against multiple users, using one or more passwords for each user. In many such attacks, most of the tries will involve failed logons with a wrong password. This attack method is used by adversaries to compromise an account which has an easy to guess password.

The inventors found it useful to profile the average number of users which perform the same number of logon attempts, in order to detect anomalies of authentication behavior emitted from one machine account in conjunction with a possible password spray attack. They also found utility in excluding attempts involving an old password (a.k.a. obsolete password, former password) of an attacked account when profiling logon failures (a.k.a. login failures).

For example, one innovative approach to password spray attack detection would proceed as follows in a hypothetical situation. Assume that event data for failed logon attempts during the past 12 hours for users A, B, C, D, E, and F is generated using familiar instrumentation and logging technologies, and is gathered by a SIEM (security and event management tool) into an event set. Upon inspection, an intrusion detection system (IDS) as taught herein determines that the password for user F's account was changed by F through the normal password change process two days ago, so failed logon event data for F's account is filtered out on the assumption that any failed logins are likely due to F having some difficulty recalling the new password. The IDS also determines that some of the logon failures for E's account used an old password, which was E's password a month ago but has not been E's password for the past three weeks. These logon failure events are also filtered out, on the assumption that E mistakenly entered the old password.

The IDS next determines that A's account has three failed logon attempts in the past 12 hours, B's account has none, C's account has three, and D's account has four. The IDS then divides the account identifiers into buckets based on the number of failed login attempts. The IDS places no account identifier in a one-failure bucket; places account identifiers for A, C, and D in a two-to-four-failures bucket, and places no account identifier in a five-or-more-failures bucket.

Assume that historically the accounts A, B, C, D, E, and F have collectively had an average of 0.5 logon failures per comparable 12 hour period (e.g., another weekday non-holiday period from 8 am to 8 pm), with a standard deviation of 0.25. Thus, historically the average number of these accounts which have had two-to-four logon failures in a similar 12 hour period is zero, but in the present situation the average is (3+3+4)/3=3.33 after truncation. Assume the IDS is configured to generate an alert when the average number of accounts with a given range of logon failures is at least 2.0 greater than the historic average for that range. Since 3.33 is at least 2.0 greater than zero, the IDS generates a password spray attack alert for accounts A, C, and D.

One of skill will understand that access attempt behavior can be similarly analyzed according to teachings provided herein, in many other situations. In particular, the number of user accounts involved, the simplifying assumption that users correspond 1-to-1 with user accounts, the time periods used, the bucket ranges used, the number of buckets used, the exclusion filters used, and other specifics of the hypothetical are merely illustrative and do not limit the scope of the teachings presented herein or the variety of possible embodiments that are consistent with those teachings.

Some embodiments described herein may be viewed by some people in a broader context. For instance, concepts such as alerts, failures, grouping, logons, and security may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as detecting low and slow password spray attacks designed to avoid automatic account lockouts after a specific number of failed login attempts in a given period of time. Other configured storage media, systems, and processes involving alerts, failures, grouping, logons, or security are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular account environments, tools, contexts, identifiers, fields, properties, files, data structures, notations, control flows, pseudocode, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as automatically obtaining, filtering, and analyzing logged events, inserting user identifiers into digital buckets based on comparisons and numeric calculations, and computing involvement extents, which are all activities deeply rooted in computing technology. Thus, purely mental processes are excluded. Some embodiments improve the functioning of computing systems by enhancing cybersecurity through the automatic detection of apparent, likely, or actual spray attacks. Some detect an actual spray attack in sufficient time to disrupt the attack, mitigate harm from the attack, identify a source of the attack, or identify a user account as compromised promptly after it is breached by the attack. Other advantages based on the technical characteristics of the teachings will also be apparent to one of skill from the description provided.

Some Claim Parameter Names

Some of the parameter names (a.k.a. process parameter names, process input names, component names, constituent item names, etc.) that may be used in some of the claims presented are defined below. Others are defined elsewhere herein, within claims or otherwise, or do not require definition here in order to be understood by one of skill.

AR: average number of user accounts whose respective access failure counts are each in a range R B: bucket for holding user account identifiers E: extent (amount) of user accounts apparently under attack, at least for a particular range R of access failure counts H: days (or other time unit) of historic access failure event data gathered as part of calculating an alert threshold T K: days (or other time unit) generally R: range of access failure counts, defined by one or two endpoints; a range may have a single numeric value (i.e., equal endpoint values), a pair of different numeric endpoint values, or a numeric lower endpoint value and an arbitrarily large upper endpoint (e.g., "100 or greater")

STDV: standard deviation

T: alerting threshold

Z: breached user account, or apparently breached user account, or identifier of same Acronyms, Abbreviations, and Names Generally Some additional acronyms, abbreviations, and names are defined below. Others are defined elsewhere herein, or do not require definition here in order to be understood by one of skill.

ALU: arithmetic and logic unit

API: application program interface

ATP: Azure® Advanced Threat Protection (mark of Microsoft Corp.)

BIOS: basic input/output system

CD: compact disc

CPU: central processing unit

DVD: digital versatile disk or digital video disc

FPGA: field-programmable gate array

FPU: floating point processing unit

GCS: guarded computing system

GPU: graphical processing unit

GUI: graphical user interface

IDS: intrusion detection system, may be or include an HIDS (host-based IDS) or an NIDS (network-based IDS), for example IaaS or IAAS: infrastructure-as-a-service IoT: internet of things IP: internet protocol LAN: local area network NTLM: NT Lan Manager, where NT denotes Microsoft New Technology products OS: operating system PaaS or PAAS: platform-as-a-service RAM: random access memory ROM: read only memory UEFI: Unified Extensible Firmware Interface VM: virtual machine WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as filtering events, inserting account identifiers in digital buckets, computing account involvement extents, calculating alert thresholds, and generating alerts are understood herein as inherently digital. A human mind cannot interface directly with a CPU or other processor, or with RAM or other digital storage, to read and write the necessary data to perform the spray attack detection steps taught herein. This would all be well understood by persons of skill in the art in view of the present disclosure, but others may sometimes need to be informed or reminded of the facts. Unless stated otherwise, embodiments are presumed to be capable of operating at production scale (i.e., operating with event data of at least ten user accounts at a time) in commercial production environments when properly configured, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, analyzing, ascertaining, associating, attempting access, breaching, calculating, changing, computing, creating, detecting, disrupting, excluding, executing, filtering, finding, generating, getting, hitting, identifying, indicating, initializing, inserting, locating, logging in, mitigating, monitoring, partitioning, reading, securing, spraying, tuning, (and accesses, accessed, analyzes, analyzed, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment

102 computer system, also referred to as computational system or computing system

104 users

106 peripherals

108 network generally, including, e.g., LANs, WANs, software defined networks, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems (IDS), intrusion prevention systems (IPS), debuggers, profilers, compilers, interpreters, static code analysis tools, software development tools and tool suites, hardware development tools and tool suites, diagnostics 124 applications, e.g., word processors, web browsers, spreadsheets, games, email tools 126 display screens, also referred to as "displays"

128 computing hardware not otherwise associated with a reference number 106, 108, 110, 112, 114

200 intrusion detection system with spray attack detection functionality consistent with teachings provided herein 202 access attempt behavior analyzer; also referred to simply as "behavior analyzer"

204 code implementing behavior analyzer 206 digital bucket; may be implemented as a collection, set, list, array, bit vector, record, row, column, or other data structure which represents zero or more user account identifiers 208 failure count range; may be a single number (e.g., 3), a pair of numbers denoting multiple values (e.g., 3 . . . 5), or a half-open set of values (e.g., 5 or greater)

210 user account identifier; may be implemented as a string, a hash value, a pointer, an index into a table of identifiers, a handle, a globally unique identifier (GUID), or another value that identifies a user account to a kernel or to cybersecurity software or both 212 number of identifiers, e.g., as in "the bucket contains seven identifiers"; may be used as threat level (a.k.a. extent) 216

214 alert threshold; may be, e.g., a positive integer or positive floating point value 216 account involvement extent indicating how many accounts are involved in a spray attack; may be, e.g., a positive integer or positive floating point value 218 window, e.g., time period of interest when searching for indications of a spray attack 220 code which finds breached user accounts 222 event, user account, or other item susceptible to being filtered in or filtered out of consideration when searching for indications of a spray attack 224 code which filters out certain items 222

226 code which tunes one or more alert thresholds 214 by initializing an alert threshold or by changing the value of an alert threshold 228 set of access failure events; may also contain access success events 230 logged or live-captured or otherwise obtained access events, including logon failure events and logon success events, for example 232 user account in a computing system 234 credentials used for accessing, or for attempting to access, a user account 236 spray attack, e.g., a password spray attack 238 alert indicating that an apparent or actual spray attack has been detected 302 range endpoint 304 numeric value (integer or floating point, depending on implementation)

306 open endpoint, e.g., indicating values at least at large as a specified numeric value 308 upper bound 402 passwords and similar credentials such as pass phrases and PINs (personal identification numbers)

404 hash value 406 digital certificate, e.g., any certificate used by Kerberos, OAuth, NTLM, or another service or protocol for authentication 408 digital representation of biometric information 410 biometric information, e.g., information describing or derived from a fingerprint scan, retina scan, gait analysis, voiceprint, facial recognition scan, or the like 502 public cloud; also refers to public cloud as an account activity environment 504 private cloud; also refers to private cloud as an account activity environment 506 hybrid cloud; also refers to hybrid cloud as an account activity environment; clouds 502, 504, 506 and otherwise are examples of networks 108; cloud; a "cloud" may also be referred to as a "cloud environment" or a "cloud computing environment"

508 private network; also refers to private network as an account activity environment; private networks are an example of a network 108

600 security mechanisms 602 firewall 604 proxy server 606 data loss prevention software or appliance 608 authentication system, e.g., Kerberos, OAuth, or NTLM, or the like 610 intrusion prevention system (IPS); may also perform intrusion detection (spray attack detection is an example of the broader category of intrusion detection)

700 ingredients used in some embodiments when determining whether to generate an alert 702 average number of user accounts whose number of access failure events is in a particular range; also referred to as "AR"

704 number of user accounts whose number of access failure events is in a particular range 706 number of access failure events in a particular range; may be used as an extent 216

708 standard deviation of AR 702

710 minimum difference required between an alert threshold and AR 800 response to a cyberattack 802 disruption of a cyberattack, e.g., reducing or eliminating additional access attempts during a spray attack by closing ports, discarding or quarantining packets, or changing account credentials 804 identification of a source of a cyberattack, e.g., determining the IP address or domain from which sprayed access attempts arrive at a guarded computing system 806 source of a cyberattack, e.g., an IP address or domain from which sprayed access attempts arrive at a guarded computing system 808 mitigation of harm caused by a cyberattack, e.g., resetting credentials of compromised accounts whose credentials were changed by an attacker and thus restoring access to the authorized user, or restoring data that was altered or deleted after an account was breached

810 harm caused by a cyberattack, e.g., altered or deleted data, altered or deleted access permissions

812 identification of an account breached by a cyberattack, e.g., an account identifier 210 of a breached account

902 filters for including or excluding items 222 from consideration when searching for indications of a spray attack; 902 also refers to the act of applying such as filter, e.g., to include or exclude on a particular customer's accounts, a particular network segment, a particular address range, or particular applications or services, or to exclude items 222 to reduce false results

Figure 10:
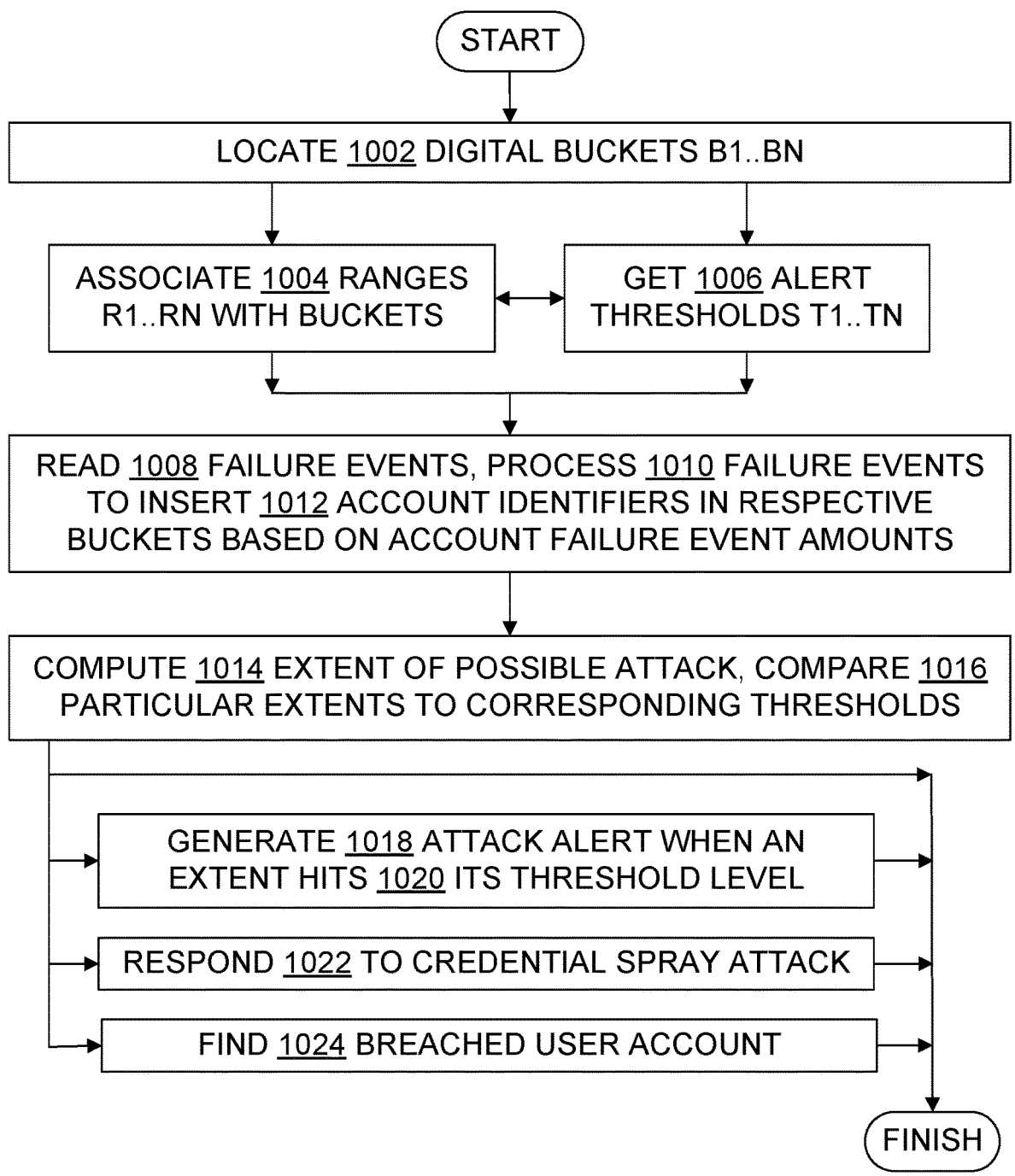
FIG. 10 is a flowchart illustrating steps in some credential spray attack detection processes.

1000 flowchart; 1000 also refers to credential spray attack detection processes, including processes illustrated by or consistent with the FIG. 10 flowchart

1002 locate a digital bucket; may include allocating memory for the bucket data structure

1004 associate range with bucket, e.g., by assigning values to endpoint fields in a bucket data structure

1006 get alert threshold

1008 read events from set containing failure events

1010 process failure events, e.g., by sorting or counting that supports insertion 1012, or by filtering 902, or both

1012 insert user account identifiers in bucket based on failure count for attempts to access user accounts

1014 computer extent of possible attack

1016 compare extent to threshold to see if extent hits (i.e., meets or exceeds) threshold

1018 generate a spray attack alert

1020 hit (i.e., meet or exceed) an attack threshold

1022 respond to an attack, e.g., perform or initiate one of the attack responses 800

1024 find a breached account

Figure 11:
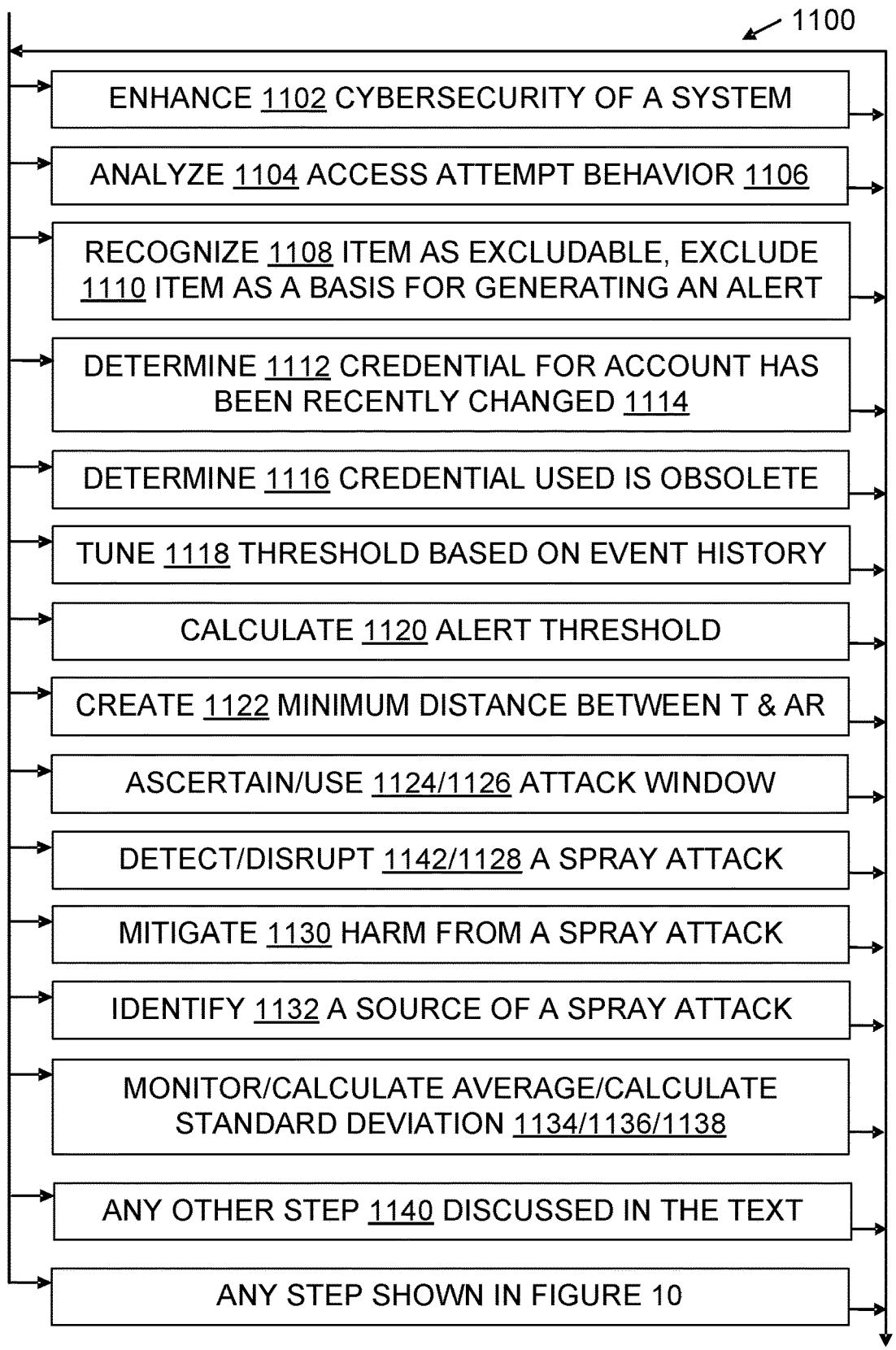
FIG. 11 is a flowchart further illustrating steps in some credential spray attack detection processes.

1100 flowchart; 1100 also refers to credential spray attack detection processes and contextual actions, including processes illustrated by or consistent with the FIG. 11 flowchart (which incorporates the FIG. 10 flowchart)

1102 enhance cybersecurity of a system, e.g., by reducing the risk that a credential spray attack will not be detected at all, or will detected only after one or more accounts are breached by the attack

1104 analyze access attempt behavior, e.g., using a behavior analyzer 202 or other tool consistent with teachings herein

1106 access attempt behavior, e.g., attempts to login or otherwise access user account resources or data or services using one or more credentials

1108 recognize an item as excludable

1110 exclude an item; this is an example of filtering 902

1112 determine that a credential restricting access to an account has been changed

1114 change a credential restricting access to an account

1116 determine that a credential used in an attempt to access an account is obsolete, e.g., is a former password for the account

1118 tune an alert threshold, e.g., initialize or change the threshold's value

1120 calculate an alert threshold value

1122 create a minimum distance between an average such as AR and an alert threshold

1124 ascertain an attack window, e.g., by receiving user input asking for analysis of the most recent K hours of activity; attack window may be defined explicitly by a user or a configuration file or value embedded in code, or be defined implicitly by selection of a set 228 of events 20 currently of interest

1126 use an attack window, e.g., by excluding items whose timestamp is outside the window

1128 disrupt a cyberattack

1130 mitigate harm from a cyberattack

1132 identify a source of a cyberattack

1134 monitor access attempts to gather data to calculate a historic average AR for a GCS

1136 calculate a historic average AR for a GCS

1138 calculate a standard deviation of a historic average AR for a GCS

1140 any step discussed in the present disclosure that has not been assigned some other reference numeral

1142 detect a credential spray attack, either during the attack or afterward Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, testers, engineers, auditors, and end-users are each a particular type of user 104. Automated agents, scripts, playback software, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 9, some embodiments use or provide an intrusion detection system (IDS) 200 for a guarded computing system (GCS) 130. The GCS may be any computing system 102 having a plurality of user accounts 232 which have respective user account identifiers 210. The intrusion detection system 200 in this example includes a processor 110, and a memory 112 in operational communication with the processor, and other components as discussed herein, such as one or more buckets 206 and alert thresholds 214.

An access failure event set 228 resides at least piecewise in the memory 112. The access failure event set 228 includes access failure events 230 which represent failed attempts to use credentials 234 to access user accounts 232. A bucket B 206 is configured (e.g., defined by code, and allocated memory) to hold user account identifiers 210. Bucket B has a failure count range R 208 which has at least one endpoint value 304.

This embodiment of the IDS also includes an attack window 218 which specifies a time period of interest. In other embodiments, an attack window is not specified and therefore all failure events 230 in the set 228 are considered, or at least none in the set are filtered 902 out of consideration as evidence of a spray attack based on their event timestamps.

This embodiment of the IDS also includes an alert threshold T 214 which represents an amount of user accounts 232. The alert threshold may be based on historic data, as described elsewhere herein.

A behavior analyzer in the IDS 200 utilizes execution of the processor 110 to analyze GCS access attempt behavior based on at least some of the access failure events. The analysis includes (a) inserting in B the identifiers 210 of user accounts 232 whose number 706 of access failure events 230 within the attack window 218 time period is in the range R 208, (b) computing an extent E 216 based on the number of user account identifiers in B, and (c) generating a spray attack alert 238 when the computed extent E meets or exceeds the alert threshold T. Accordingly, the intrusion detection system 200 enhances cybersecurity of the GCS 130 by generating the spray attack alert 238 in response to detection of an apparent credential spray attack against the GCS.

Figure 2:
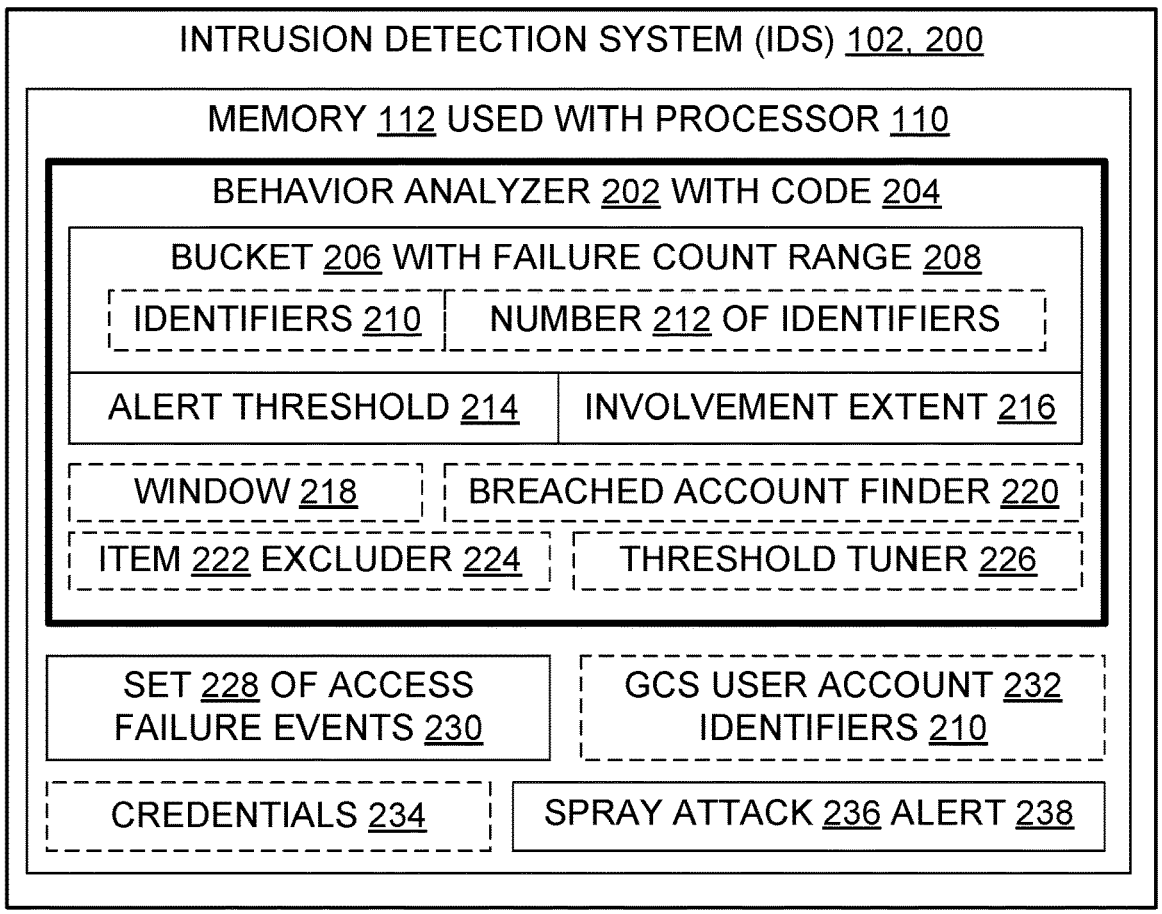
FIG. 2 is a block diagram illustrating aspects of an intrusion detection system (IDS) architecture.
Figure 3:
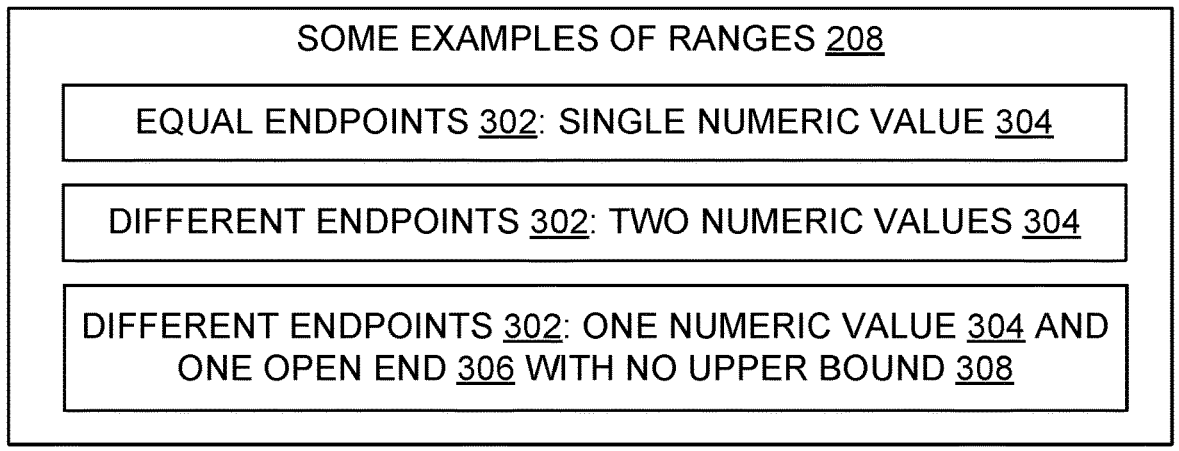
FIG. 3 is a block diagram illustrating some examples of ranges used in an access attempt behavior analyzer.
Figure 4:
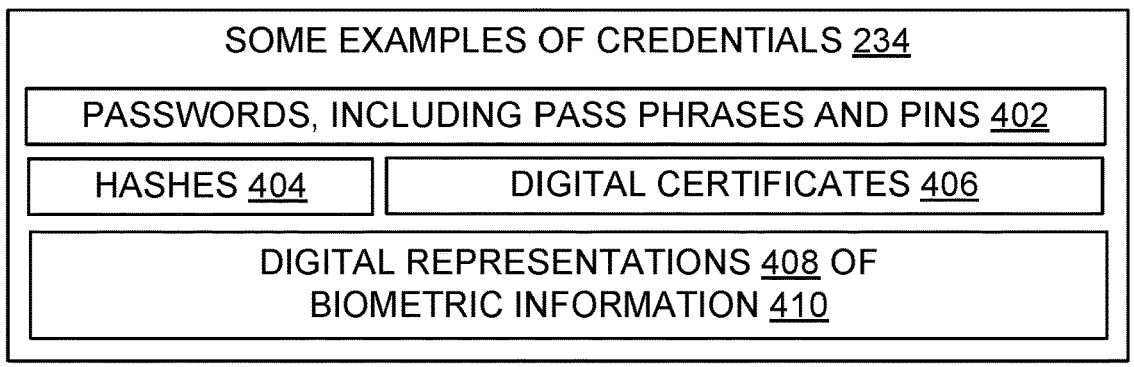
FIG. 4 is a block diagram illustrating some examples of credentials that may be used in a credential spray attack.
Figure 5:
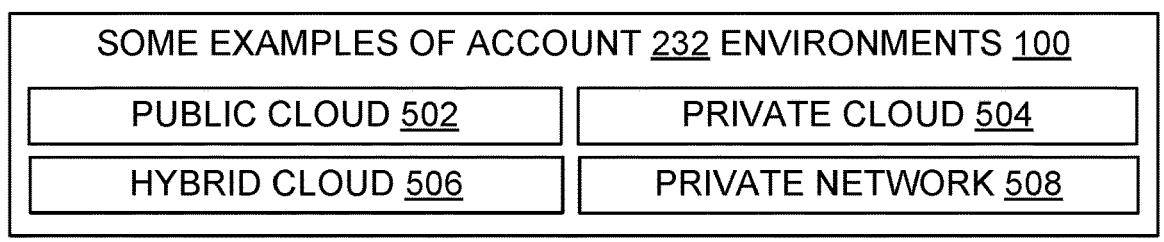
FIG. 5 is a block diagram illustrating some examples of account environments.
Figure 6:
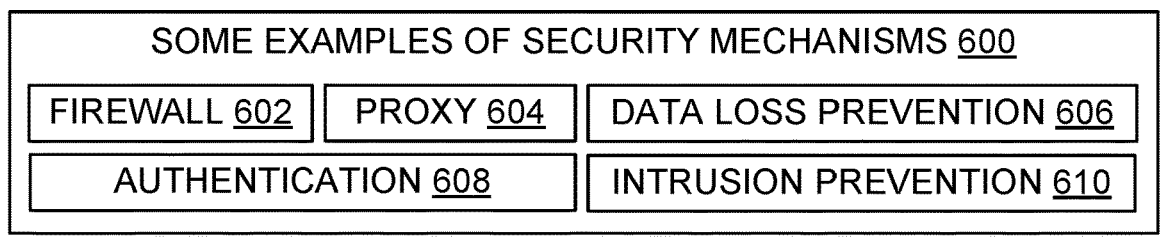
FIG. 6 is a block diagram illustrating some examples of security mechanisms.

The example embodiments just described may each have one or more buckets 206, although for convenience FIG. 2 shows only a single bucket 206. Some embodiments include a plurality of N buckets B1 . . . BN. The buckets B1 . . . BN associated with respective failure count ranges R1 . . . RN. These ranges 208 partition a numeric range from a lowest endpoint of R1 to a highest endpoint of RN. For example, ten buckets could partition an overall range of 1 . . . 200 into the following per-bucket ranges:

R1: 1 (could also be written as 1 . . . 1)
R2: 2 . . . 5
R3: 6 . . . 10
R4: 11 . . . 20
R5: 21 . . . 30
R6: 31 . . . 50
R7: 51 . . . 80
R8: 81 . . . 100
R9: 101 . . . 150
R10: 151 . . . 200

One of skill will recognize this ten-bucket example as a partitioning of 1 . . . 200 because every value in 1 . . . 200 falls within exactly one of the ranges Ri. As another example, the overall range 1 . . . infinity could be partitioned into four buckets thus:

R1: 1 . . . 2
R2: 3 . . . 10
R3: 11 . . . 100
R4: 101 or greater

Many other partitions may also be suitable in a given embodiment. In addition to the buckets B1 . . . BN and their ranges R1 . . . RN, the system 200 in these examples also includes a plurality of alert thresholds T1 . . . TN and a plurality of computed extents E1 . . . EN corresponding to the buckets B1 . . . BN. The behavior analyzer 202 analyzes GCS access attempt behavior on a per-bucket basis, with N being at least 2. Use of multiple buckets is consistent with FIG. 2, and is further illustrated in FIG. 9.

Note that although filters 902 are shown in FIG. 9, this is for convenience only. Filters 902 may be present or be absent, independently of whether a single bucket 206 or multiple buckets 206 are used in a given embodiment.

In some embodiments, the IDS 200 is further characterized by at least one of the following characteristics: the credentials 234 include plaintext passwords, pass phrases, or PINs (collectively designated by reference numeral 402); the credentials 234 include hashes 404; the credentials 234 include digital certificates 406; or the credentials 234 include digital representations 408 of biometric information 410. In other words, although the tools and techniques taught herein were originally motivated by password spray attacks, they are also applicable in various embodiments to detect other credential spray attacks. In recognition of this capability, the phrase "credential spray attack" was coined for use herein.

In some embodiments, the IDS 200 is further characterized by at least one of the following characteristics: the user account identifiers 210 identify accounts in a public cloud GCS 502, 130; the user account identifiers 210 identify accounts in a hybrid cloud GCS 506, 130; or the user account identifiers 210 identify accounts in a network GCS 508, 130 which is private in the sense that it communicates with the internet via a security mechanism 600. Thus, a network 108 behind a firewall 602 or a proxy server 604 or other security mechanism 600 is considered herein a "private" network 508.

Embodiments described herein may be part of a defense in depth approach to cybersecurity. Embodiments are generally compatible with other security mechanisms 600. In particular, using embodiments taught herein does not necessarily prevent or inhibit usage of different tools or techniques for reducing spray attack impact, e.g., multifactor authentication, frequent password changes, increased password complexity, screening password requests to reject well known passwords submitted by users, and so on. Multiple security tools and techniques may be combined, e.g., in an offering such as Microsoft's Azure® ATP (Advanced Threat Protection) solution (mark of Microsoft Corporation).

In some embodiments, the IDS 200 has an excluder 224 which excludes certain excludable items 222 (events 230 or user accounts 232 or both). As a result, the behavior analyzer 202 omits the excluded items from the GCS access attempt behavior analysis. For instance, accounts 232 whose password was recently changed by an authorized user may be excluded, on the assumption that failed login attempts are the result of the user's difficulty remembering the new password, not the result of a spray attack. More generally, in some cases the excluder 224 recognizes as excludable and then excludes at least one of the following items:

(a) an access failure event 230 which indicates that a formerly valid credential 234 was used in a failed attempt to access a user account 232;

(b) a user account identifier 210 which identifies a user account 232 whose formerly valid credential 234 was used in a failed attempt to access the user account within the past K days, where K is in the range 1 . . . 30, (c) an access failure event 230 which identifies a user account 232 whose credential 234 was changed within the past K days, where K is in the range 1 . . . 30, (d) a user account identifier 210 which identifies a user account 232 whose credential 234 was changed within the past K days, where K is in the range 1 . . . 30.

In some embodiments, the IDS 200 has a threshold tuner 226 which initializes or changes (examples of "tuning") the alert threshold T 214 based on historic access failure data. For instance, the initial alert threshold may be set at two standard deviations above the average AR over the past week. Of course, many other time periods and calculation formulas may also be used to tune the alert threshold 214 in various embodiments.

In some embodiments, the IDS 200 has a breached account finder (BAF) 220. In operation, the BAF 220 finds a user account Z that has apparently been breached by finding a sequence of login failures followed by a login success, for an account which was targeted during a spray attack 236. That is, in some embodiments the BAF 220 finds that an account Z 232 has been breached, based on the presence of the Z's account identifier 210 in the bucket 206 when the extent E 216 met or exceeded T 214, thereby generating the spray attack alert 238, and also based on failed access attempts against Z being followed by an access success event indicating successful access to Z.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific configurations, implementations, arrangements, displays, features, approaches, languages, or scenarios provided herein. A given embodiment may include additional or different technical features, mechanisms, sequences, data structures, or functionalities for instance, and may otherwise depart from the examples provided herein.

Processes (a.k.a. Methods)

FIG. 10 illustrates an example method 1000 for detecting credential spray attacks. FIG. 11 further illustrates spray attack detection processes, including refinements, supplements, or contextual actions for steps shown in FIG. 10. Technical processes shown in the Figures or otherwise disclosed will be performed automatically, e.g., by an intrusion detection system 200, unless otherwise indicated. Processes may also be performed in part automatically and in part manually to the extent action by a human administrator or other human person is implicated, e.g., in some embodiments a person may enter a command to set an alert threshold 214 or specify an attack window 218 or other parameter. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 10 and 11. Steps may be performed serially, in a partially overlapping manner, or fully in parallel. In particular, the order in which flowchart 1000 action items or flowchart 1100 action items are traversed to indicate the steps performed during a process may vary from one performance of the process to another performance of the process. The traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide an intrusion detection process for detecting credential spray attacks 236 against a guarded computing system (GCS) 130, the GCS 130 having a plurality of user accounts 232 which have respective user account identifiers 210. These example intrusion detection processes include locating 1002 a digital bucket B; associating 1004 a failure count range R with the bucket B, R having at least one endpoint value; getting 1006 an alert threshold T which represents an amount of user accounts; reading 1008 access failure event data from an access failure event set, the access failure event set including access failure events which represent failed attempts to use credentials to access user accounts of the GCS; inserting 1012 in B the identifiers of user accounts whose number of access failure events is in the range R; computing 1014 an extent E based on the number of user account identifiers in B; and generating 1018 a spray attack alert when the computed extent E meets or exceeds 1020 the alert threshold T ("when" means "in response to"; there may be some delay for processing, between hitting the threshold and generating the alert). Thus, the intrusion detection process enhances 1102 cybersecurity of the GCS by generating the spray attack alert in response to detection of activity which is consistent with a credential spray attack against the GCS.

Some embodiments use or provide an intrusion detection process wherein getting 1006 the alert threshold T includes automatically calculating 1120 T based on at least the following: an average AR 702 of the number of user accounts whose number of access failure events is in the range R, and a standard deviation 708 of the average AR. In some cases, getting 1006 the alert threshold T includes excluding 1110 from calculation 1120 of T an access attempt failure which is attributable to use of an obsolete user account credential. In some cases, getting 1006 the alert threshold T includes excluding 1110 from calculation 1120 of T a failed attempt to access a user account that underwent a credential change 1114 within K previous days, K in the range of 1 to 30. In some cases, calculation 1120 of T is further based on creating 1122 at least a predetermined minimum difference between T and the average AR.

Some embodiments use or provide an intrusion detection process wherein the process detects 1142 a credential spray attack against the GCS, and the process enhances 1102 cybersecurity of the GCS by generating 1018 the spray attack alert in advance of at least one of the following responses to the detected credential spray attack: disruption 802 of the credential spray attack; mitigation 808 of harm from the credential spray attack; identification 804 of a source of the credential spray attack; or identification 812 of a user account that was breached by the credential spray attack.

Some embodiments use or provide an intrusion detection process that includes ascertaining 1124 an attack window time period, wherein the inserting 1012 inserts in B the identifiers of user accounts whose number of access failure events within the attack window time period is in the range R.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a buckets 206 with associated ranges 208, alert thresholds 214 comparable to extents 216, item excluders 224 and other filters 902, breached account finders 220, threshold tuners 226, and behavior analyzers 202, in the form of data 118 and instructions 116, read from a removable storage medium 114 and/or another source such as a network connection, to form a configured storage medium. The configured storage medium 112 is capable of causing a computer system 200 to perform technical process steps for detecting credential spray attacks against itself or another computing system 130, as disclosed herein. The Figures thus help illustrate configured storage media embodiments and process embodiments, as well as system and process embodiments. In particular, any of the process steps illustrated in FIG. 10 or 11, or otherwise taught herein, may be used to help configure a storage medium to form a configured storage medium embodiment.

Some embodiments use or provide a storage medium 112, 114 configured with code which upon execution by one or more processors performs an intrusion detection process for detecting credential spray attacks 236 against a guarded computing system (GCS) 130, the GCS having a plurality of user accounts 232 which have respective user account identifiers 210, the intrusion detection process including: locating 1002 a plurality of N digital buckets B1 . . . BN, with N being at least 2; associating 1004 respective failure count ranges R1 . . . RN with the buckets B1 . . . BN, each Ri having at least one endpoint value; getting 1006 respective alert thresholds T1 . . . TN which each represent an amount of user accounts; reading 1008 access failure event data from an access failure event set, the access failure event set including access failure events which represent failed attempts to use credentials to access user accounts of the GCS; inserting 1012 in each bucket Bi of the buckets B1 . . . BN the identifiers, if any, of user accounts whose number of access failure events is in the corresponding range Ri of the ranges R1 . . . RN, computing 1014 an extent Ei based on the number of user account identifiers in each respective non-empty bucket Bi; and generating 1018 a spray attack alert when the computed extent Ei hits 1020 (meets or exceeds) the corresponding alert threshold Ti, for at least one Ti in T1 . . . TN. The intrusion detection process enhances 1102 cybersecurity of the GCS by generating the spray attack alert in response to a credential spray attack against the GCS.

In some embodiments, the range RN is an open-ended range with a fixed and bounded lower endpoint (e.g., 100 or some other numeric value) and an arbitrarily large upper endpoint (that is, the range includes arbitrarily large numeric values above the lower endpoint). For present purposes, "arbitrarily large" and "unbounded" are interchangeable.

In some embodiments, getting 1006 respective alert thresholds T1 . . . TN includes: monitoring 1134 for at least H days attempts to use credentials to access user accounts of the GCS, where H is at least five; calculating 1136 averages AR1 . . . ARN of the number of user accounts whose number of access failure events is in the respective ranges R1 . . . RN; and calculating 1138 respective standard deviations STDV1 . . . STDVN of the averages AR1 . . . ARN. Other values for H may be used in other embodiments, e.g., 3, 4, 6, 7, 8, 9, 10, or 14.

In some embodiments, getting 1006 respective alert thresholds T1 . . . TN includes at least one of the following: excluding 1110 from calculation 1120 of at least one Ti an access attempt failure which is attributable to use of an obsolete user account credential; excluding 1110 from calculation 1120 of at least one Ti a failed attempt to access a user account that underwent a credential change within K previous days, K in the range of 1 to 45. Other values for K may be used in other embodiments, e.g., 1 to 30, 1 to 60, 1 to 90.

In some embodiments, the process further includes finding 1024 a user account Z that has apparently been breached, based on the presence of the user account's identifier in at least one bucket Bi, and also based on a subsequent access success event indicating an access to the user account Z.

Additional Examples and Observations

One of skill will recognize that not every part of this disclosure, or any particular details therein, are necessarily required to satisfy legal criteria such as enablement, written description, or best mode. Also, embodiments are not limited to the particular parameter values, networks, tools, tool contexts, identifiers, fields, data structures, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

A password spray attack involves multiple user's accounts, by spraying with one or more passwords each account. Most of the tries will result in failed logons because they use a password that is both wrong and not one of the account's old passwords. Password spray attacks are often used by adversaries to compromise an account with an easy to guess password. They succeed in part because people reuse passwords across their different accounts and prefer easy-to-remember (and often easy to guess) passwords.

Some embodiments taught herein profile the average number of user accounts which have the same logon attempts count, in order to detect statistical differences indicating anomalies in authentication behavior. For example, as a group of specific calculation examples, consider a logon fail count=1, in circumstances where the daily average is 6 users, with a standard deviation of 1.4 users. That is, on average 6 users have 1 logon failure. Now assume that an alert threshold T is calculated as:

$$T = AR + \max(STDVM * STDV + MINDIFF) \qquad (1)$$

where AR is the average number of users with 1 logon failure, STDV is the standard deviation from AR, STDVM is a standard-deviations multiplier, and MINDIFF is a minimum difference value designed to create at least a minimum distance between AR and T. AR is based on historic data in some embodiments, e.g., AR may be calculated 1136 based on the number of logon failures monitored 1134 over the course of a week, or two weeks, or some other learning period.

In this case, an embodiment would alert if 21 users had 1 logon failure evident in the applicable set of failure events 230. The value 21 corresponds to the extent E of user involvement in a possible attack. Assume the standard-deviations multiplier used is 3. Then the value of T would be calculated as:

$$T = 6 + \max(3*1.4, 10)$$

$$6 + \max(4.2, 10)$$

$$6 + 10$$

$$16$$

Since 21>16, E is greater than T, so E has hit T and an alert will be generated.

In this specific calculation example, the value 3 for STDVM in formula (1) is an example of a tunable parameter value. STDVM (standard-deviations multiplier) indicates how many standard deviations from the average AR will be used. The STDVM parameter may be adjusted 1118 based on the number or percentage of false positives produced. For instance, if using 3 as the standard-deviations multiplier yields too many false positives, then 3.5 or another value above 3 may be used instead. Increasing the standard-deviations multiplier value eventually increases the alert threshold T, which in turn means that more user accounts must be involved (by having the same number of logon failures) in order to trigger an alert. STDVM values below 3 may also be used in a given embodiment. Since STDVM*STDV is whenever STDV is zero (e.g., no change in AR over the course of days), some embodiments force STDV to be at least a minimum value, e.g., 0.5.

In this specific calculation example, the value 10 for MINDIFF in formula (1) is another example of a tunable parameter value. MINDIFF (minimum difference) indicates a minimum difference between the average AR and the alert threshold T for range R. The MINDIFF parameter may be adjusted 1118 based on the number or percentage of false positives produced. For instance, if using 10 as the minimum difference yields too many false positives, then 15 or another value above 10 may be used instead. Increasing the minimum difference value increases the alert threshold T, which in turn means that more user accounts must be involved (by having the same number of logon failures) in order to trigger an alert. MINDIFF values below 10 may also be used in a given embodiment. For instance, to detect apparent spray attacks on as few as 5 user accounts, set MINDIFF to 5 when STDVM*STDV is less than or equal to 5. In general, however, decreasing the alert threshold T tends to produce more false positives, i.e., more alerts are generated that do not actually correspond to spray attacks.

One of skill will acknowledge that network 108 errors, activity crossing window 218 boundaries, and other circumstances may introduce noise into the logon failure count. Accordingly, tolerance ingredients such as STDV, STDVM, and MINDIFF may be beneficially used when calculating an alert threshold, instead of simply setting the alert threshold to the average AR, to reduce false negatives when checking for spray attacks. False negatives can be particularly harmful to a GCS 130 that is a frequent target of spray attacks. For instance, password spray attacks against some Azure® accounts have been observed to happen as frequently, on average, as every two days (mark of Microsoft Corp.). The cost of processing false positives can be weighed against the harm of false negatives to find an acceptable mix of tolerance ingredients when tuning 1118 an IDS 200.

Some embodiments are consistent with usage in environments 100 that include network-based authentication security mechanisms 608. As a group of specific architectural data flow examples, consider an environment which includes authentication network activity using, e.g., Kerberos technology or NTLM technology, or both. Logging or other monitoring may identify authentication event activities, as recorded, e.g., in Microsoft Event 4776 records (credential validation occurred using NTLM authentication), Microsoft Event 4625 records (account failed to log on), and other events 230. Although NTLM and Kerberos are suitable examples, the teachings herein may be generalized for application with any authentication protocol.

From such authentication network activity, processing may flow to one or more of the following, wherein "Brute Force" refers to a password spray attack, but this example may be readily generalized to other credential spray attacks:

(a) Brute force exclusion update code. This code updates a Brute Force Source Account Exclusion Reason on a computer's profile. The update lasts one week (for instance). A Brute Force Source Account Exclusion Reason is applied if the user changed its password in the last week, for example, or if the user is constantly failing, e.g., in the last week the user has failed more than 50 times with an old password of the account. The updated Brute Force Source Account Exclusion Reason, or lack thereof (null), is then fed as an ingredient to code as noted below.

(b) Distinct account update code. This code updates a Distinct Source Account Counter, e.g., once per day. If this counter exceeds 50 for a given server, for example, then IsDelegationServer is set to true for that server. Delegation is used, e.g., in Kerberos, when a server or service account will impersonate a different user. In this example, delegation servers are set aside from the consideration of evidence of spray attacks so that they do not skew or blur the mapping between logon failures and user accounts.

(c) Brute force authentication activity counter update code. This code updates counters that reflect Success, WrongAndNotOldPassword, and OldPassword logon attempts for each user (i.e., each user account in this example) of interest, noting protocol and date. WrongAndNotOldPassword usage ignores logon mistakes by finding a nearby success. This data is kept for, e.g., one week.

(d) Brute force wrong password bucket update code. This code updates a brute force WrongPassword bucket on a computer's profile. This counts a daily average (for instance) of the number of users who performed the same WrongAndNotOldPassword count. In this example, "same" indicates a range which includes a single value, e.g., a WrongAndNotOldPassword count of 2, or a WrongAndNotOldPassword count of 3. However, this can be generalized to a range that covers multiple counts, as taught elsewhere herein. Regardless, the updated WrongAndNotOldPassword count is then fed as an ingredient to code as noted below.

(e) Brute force detection code. This code detects a brute force spray attack using the WrongPassword bucket of computer an account exclusion reasons. For each computer found in the most recent authentication activities (i.e., when all computers recently involved in authentication attempts are of interest), and for users without an exclusion reason per code block (a) above and which have WrongAndNotOldPassword>0, this code divides users into one or more buckets based on WrongPassword count. If one of the bucket's amount of users is above a threshold based on the daily average from code block (d) above, then an attack alert is generated. The threshold may be calculated, e.g., as the daily average+max(STDVM*STDV, MINDIFF) or another calculation.

As further examples, in some embodiments a cybersecurity method for detecting password spray attacks includes: automatically computing 1014 a password spray threat level 216; computationally determining that the password spray threat level meets or exceeds 1020 a predetermined password spray alert threshold 214 which is based on at least the following: an average 702 of a number of user accounts in a computing system 130 who have a given access attempt failure count which is above zero, and a standard deviation 708 of the average; and electronically transmitting 1018 a password spray alert 238; whereby the method increases 1102 cybersecurity of the computing system 130 by detecting 1142 a password spray attack in sufficient time to allow at least one of the following responses 800 to the attack: disruption of the attack, mitigation of harm from the attack, identification of a source of the attack, or identification of an account compromised by the attack. Some embodiments repeat at least the password spray threat level 216 computation 1014 for a different access attempt failure count 208.

Some embodiments exclude login failures that were caused by using an old password. Thus, the cybersecurity method may further include excluding 1110 an access attempt failure count F of a user account X from computation 1014 of the password spray threat level 216, where the access attempt failure count F is attributable to use of an obsolete password of the user account X.

Some embodiments exclude login failures that happened because the user changed its password in the last week, for example. "Last week" is generalized to any time period from 1 day to 30 days. Thus, the cybersecurity method may further include excluding 1110 an access attempt failure count F of a user account X from computation 1014 of the password spray threat level 216, where the password of user account X was changed 1114 within N previous days, N in the range of 1 to 30.

Some embodiments exclude login failures that happened because the user is constantly failing, e.g., in the last week the user has failed more than 50 times with the old password. In the claim, "50 times" and "last week" are both generalized. Thus, the cybersecurity method may further include excluding 1110 an access attempt failure count F of a user account X from computation 1014 of the password spray threat level 216, where access attempt failure count F is attributable to at least K uses of an obsolete password of the user account X within N previous days, N in the range of 1 to 30, K in the range of 50 to 100.

In some embodiments, automatically computing 1014 the password spray threat level 216 is further based on at least a predetermined minimum difference 710 between the average 702 and the password spray alert threshold 214.

Embodiments are understood to also include or benefit from tested and appropriate security controls and privacy controls, e.g., it is understood that appropriate measures should be taken to help prevent misuse of the event set and help avoid tampering with the behavior analysis. Use of the tools and techniques taught herein is compatible with use of such controls.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, the teachings provided herein may be applied to enhance 1102 cybersecurity of a guarded computing system (GCS) 130. An intrusion detection system (IDS) 200 is created or upgraded to detect credential 234 spray attacks 236. GCS accounts 232 with access failure events 230 are divided into digital buckets B1 . . . BN 206 based on access failure count ranges R1 . . . RN 208. For instance, accounts with one logon failure may go in B1, accounts with two failures in B2, etc. Different ranges 208 may also be used, including for example ranges that cover more than one numeric value 304, and open-ended (unbounded 308) ranges such as failure counts of at least X, for X a finite value greater than 1. Buckets 206 will thus have account involvement extents E1 . . . EN 216, which are compared to thresholds T1 . . . TN 214. An intrusion detection tool 202 generates 1018 an alert 238 when some Ei hits 1020 its Ti. Detection 1142 may spot any credential sprays 236, not merely password 402 sprays. False positives may be reduced by excluding 1110 items 222 from consideration, such as logon attempts using old passwords. False positives and false negatives may be balanced by tuning 1118 threshold parameters such as STDVM or MINDIFF. Breached accounts may be found 1024. Detection 1142 may also permit other responses 800, such as attack disruption 802, harm mitigation 808, and attacker identification 804. Credential spray attack detection technologies taught herein may be combined with other security mechanisms 600 for defense in depth of cloud 502, 504, 506 (and community cloud) accounts 232 and other network 108, 508 accounts 232.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10 and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An intrusion detection system for a guarded computing system (GCS), the GCS having a plurality of user accounts which have respective user account identifiers, the intrusion detection system comprising:
    a processor;
    a memory in operational communication with the processor;
    an access failure event set residing at least piecewise in the memory, the access failure event set including access failure events which represent failed attempts to use credentials to access user accounts;
    a bucket B configured to hold user account identifiers, B having a failure count range R which has at least one endpoint value;
    an attack window which specifies a time period;
    an alert threshold T which represents an amount of user accounts;
    a behavior analyzer which utilizes execution of the processor to analyze GCS access attempt behavior based on at least some of the access failure events by (a) inserting in B the identifiers of user accounts whose number of access failure events within the attack window time period is in the range R, (b) computing an extent E based on the number of user account identifiers in B, and (c) generating a spray attack alert when the computed extent E meets or exceeds the alert threshold T; and
    a plurality of N buckets B1 . . . BN, the buckets B1 . . . BN associated with respective failure count ranges R1 . . . RN, wherein the ranges partition a numeric range from a lowest endpoint of R1 to a highest endpoint of RN, wherein the system also includes a plurality of alert thresholds T1 . . . TN and a plurality of computed extents E1 . . . EN corresponding to the buckets B1 . . . BN, and wherein the behavior analyzer analyzes GCS access attempt behavior on a per-bucket basis with N being at least 2;
    whereby the intrusion detection system enhances cybersecurity of the GCS by generating the spray attack alert in response to detection of an apparent credential spray attack against the GCS.

2. The system of claim 1, wherein N is at least 3.

3. The system of claim 1, further characterized by at least one of the following characteristics:
    the credentials comprise plaintext passwords, pass phrases, or PINs;
    the credentials comprise hashes;
    the credentials comprise digital certificates; or
    the credentials comprise digital representations of biometric information.

4. The system of claim 1, further characterized by at least one of the following characteristics:
    the user account identifiers identify accounts in a public cloud GCS;
    the user account identifiers identify accounts in a hybrid cloud GCS; or
    the user account identifiers identify accounts in a network GCS which communicates with the Internet via a security mechanism.

5. The system of claim 1, further comprising an excluder which excludes items by excluding events or user accounts or both, and wherein the behavior analyzer omits excluded items from the GCS access attempt behavior analysis.

6. The system of claim 5, wherein the excluder recognizes as excludable and then excludes at least one of the following items:
    an access failure event which indicates that a formerly valid credential was used in a failed attempt to access a user account;
    a user account identifier which identifies a user account whose formerly valid credential was used in a failed attempt to access the user account within the past K days, where K is in the range 1 . . . 30;
    an access failure event which identifies a user account whose credential was changed within the past K days, where K is in the range 1 . . . 30;
    a user account identifier which identifies a user account whose credential was changed within the past K days, where K is in the range 1 . . . 30.

7. The system of claim 1, further comprising a threshold tuner which initializes or changes the alert threshold T based on historic access failure data.

8. The system of claim 1, further comprising a breached account finder which finds a user account Z that has apparently been breached, based on the presence of the Z's account identifier in the bucket when the extent E met or exceeded T, thereby generating the spray attack alert, and also based on failed access attempts against Z being followed by an access success event indicating successful access to Z.

9. An intrusion detection process for detecting credential spray attacks against a guarded computing system (GCS), the GCS having a plurality of user accounts which have respective user account identifiers, the intrusion detection process comprising:
locating a digital bucket B which is one of a plurality of N buckets B1 . . . BN with N being at least 2;
associating a failure count range R with the bucket B, R having at least one endpoint value, the buckets B1 . . . BN associated with respective failure count ranges R1 . . . RN wherein the ranges partition a numeric range from a lowest endpoint of R1 to a highest endpoint of RN, and
wherein R is one of the ranges R1 . . . RN;
getting an alert threshold T which is one of a plurality of alert thresholds T1 . . . TN, the alert threshold T representing an amount of user accounts;
reading access failure event data from an access failure event set, the access failure event set including access failure events which represent failed attempts to use credentials to access user accounts of the GCS;
inserting in B the identifiers of user accounts whose number of access failure events is in the range R;
computing an extent E which is one of a plurality of computed extents E1 . . . EN corresponding to the buckets B1 . . . BN, the extent E based on the number of user account identifiers in B; and
generating a spray attack alert when the computed extent E meets or exceeds the alert threshold T;
whereby the intrusion detection process enhances cybersecurity of the GCS by analyzing GCS access attempt behavior on a per-bucket basis and generating the spray attack alert in response to detection of activity which is consistent with a credential spray attack against the GCS.

10. The process of claim 9, wherein getting the alert threshold T comprises automatically calculating T based on at least the following: an average AR of the number of user accounts whose number of access failure events is in the range R, and a standard deviation of the average AR.

11. The process of claim 10, wherein getting the alert threshold T comprises excluding from calculation of T an access attempt failure which is attributable to use of an obsolete user account credential.

12. The process of claim 10, wherein getting the alert threshold T comprises excluding from calculation of T a failed attempt to access a user account that underwent a credential change within K previous days, K in the range of 1 to 30.

13. The process of claim 10, wherein calculation of T is further based on creating at least a predetermined minimum difference between T and the average AR.

14. The process of claim 9, wherein the process detects a credential spray attack against the GCS, and the process enhances cybersecurity of the GCS by generating the spray attack alert in advance of at least one of the following responses to the detected credential spray attack:
disruption of the credential spray attack;
mitigation of harm from the credential spray attack;
identification of a source of the credential spray attack; or
identification of a user account that was breached by the credential spray attack.

15. The process of claim 9, further comprising ascertaining an attack window time period, and wherein the inserting inserts in B the identifiers of user accounts whose number of access failure events within the attack window time period is in the range R.

16. A non-transitory storage memory configured with code which upon execution by one or more processors performs an intrusion detection process for detecting credential spray attacks against a guarded computing system (GCS), the GCS having a plurality of user accounts which have respective user account identifiers, the intrusion detection process comprising:
locating a plurality of N digital buckets B1 . . . BN, with N being at least 2;
associating respective failure count ranges R1 . . . RN with the buckets B1 . . . BN, wherein the ranges partition a numeric range from a lowest endpoint of R1 to a highest endpoint of RN;
getting respective alert thresholds T1 . . . TN which each represent an amount of user accounts;
reading access failure event data from an access failure event set, the access failure event set including access failure events which represent failed attempts to use credentials to access user accounts of the GCS;
inserting in each bucket Bi of the buckets B 1 . . . BN the identifiers, if any, of user accounts whose number of access failure events is in the corresponding range Ri of the ranges R1 . . . RN;
computing an extent Ei based on the number of user account identifiers in each respective non-empty bucket Bi; and
generating a spray attack alert when the computed extent Ei meets or exceeds the corresponding alert threshold Ti, for at least one Ti in T1 . . . TN;
whereby the intrusion detection process enhances cybersecurity of the GCS by analyzing GCS access attempt behavior on a per-bucket basis and generating the spray attack alert in response to a credential spray attack against the GCS.

17. The non-transitory storage memory of claim 16, wherein the range RN is an open-ended range with a fixed and bounded lower endpoint and an arbitrarily large upper endpoint.

18. The non-transitory storage memory of claim 16, wherein getting respective alert thresholds T1 . . . TN comprises:
monitoring for at least H days attempts to use credentials to access user accounts of the GCS, where H is at least five;
calculating averages AR1 . . . ARN of the number of user accounts whose number of access failure events is in the respective ranges R1 . . . RN; and
calculating respective standard deviations STDV1 . . . STDVN of the averages AR1 . . . ARN.

19. The non-transitory storage memory of claim 16, wherein getting respective alert thresholds T1 . . . TN comprises at least one of the following:
excluding from calculation of at least one Ti an access attempt failure which is attributable to use of an obsolete user account credential;
excluding from calculation of at least one Ti a failed attempt to access a user account that underwent a credential change within K previous days, K in the range of 1 to 45.

20. The non-transitory storage memory of claim 16, further comprising finding a user account Z that has apparently been breached, based on the presence of the user account's identifier in at least one bucket Bi, and also based on a subsequent access success event indicating an access to the user account Z.

* * * * *